(12) United States Patent
DeBates et al.

(10) Patent No.: US 10,474,889 B2
(45) Date of Patent: Nov. 12, 2019

(54) CONTEXT DATA ASSOCIATED WITH IMAGE CONTENT

(71) Applicant: Motorola Mobility LLC, Chicago, IL (US)

(72) Inventors: Scott Patrick DeBates, Crystal Lake, IL (US); Douglas Alfred Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/697,090

(22) Filed: Sep. 6, 2017

(65) Prior Publication Data

US 2019/0073527 A1 Mar. 7, 2019

(51) Int. Cl.
*H04N 5/76* (2006.01)
*G06K 9/00* (2006.01)
*G06K 7/10* (2006.01)
*H04N 1/00* (2006.01)

(52) U.S. Cl.
CPC ..... *G06K 9/00456* (2013.01); *G06K 7/10297* (2013.01); *H04N 1/00188* (2013.01)

(58) Field of Classification Search
CPC ............ H04N 1/00204; H04N 1/2154; H04N 1/00132; H04N 1/00485; G03B 2206/00; G03B 2206/002; H04W 12/04; H04W 12/06; H04L 9/0285
See application file for complete search history.

(56) References Cited

U.S. PATENT DOCUMENTS

| | | | | |
|---|---|---|---|---|
| 7,609,165 B2 * | 10/2009 | Sharma | ............... | G08B 13/2417 340/540 |
| 9,834,024 B1 * | 12/2017 | Takada | ............... | G06K 7/10009 |
| 9,867,042 B2 * | 1/2018 | Atherton | ............... | H04W 12/04 |
| 2007/0229678 A1 * | 10/2007 | Barrus | ...................... | H04N 5/77 348/231.3 |
| 2008/0148050 A1 * | 6/2008 | Sparrell | .................. | H04L 63/10 713/168 |
| 2009/0190987 A1 * | 7/2009 | Vleurinck | ............... | B41J 3/4075 400/76 |
| 2010/0007710 A1 * | 1/2010 | Miyaso | .................. | B41J 29/393 347/110 |
| 2012/0155700 A1 * | 6/2012 | Huang | ............... | H04N 1/32138 382/100 |
| 2012/0195665 A1 * | 8/2012 | Tajiri | .................. | G03G 15/5029 399/361 |
| 2017/0242980 A1 * | 8/2017 | Barrington | ............. | G16H 10/20 |

* cited by examiner

Primary Examiner — Kelly L Jerabek
(74) Attorney, Agent, or Firm — SBMC

(57) ABSTRACT

Context data associated with image content is described herein. In some implementations, image content is received from an imager. Context data associated with the received image content is gathered. The image content is printed to provide a printed image, and a readable tag embodying the context data is physically associated with the printed image.

18 Claims, 5 Drawing Sheets

CONTEXT DATA ASSOCIATED WITH IMAGE CONTENT

BACKGROUND

Pictures or videos taken by a user will mean many different things to those who view them. In addition, the context in which the picture or video was taken will perhaps be forgotten as hundreds or even thousands of pictures and videos are taken and collected over the years. Some viewers of the pictures or video may not know who the subjects are, why the picture or video was taken, or where it was taken. The picture or video taker, the subjects appearing therein, and those who are not associated with the pictures or video may all need different context to understand the pictures or video. In the past, the only way to convey the context surrounding the picture or video was to physically write on the back of the picture, CD, or DVD, or to add information to a corresponding file, in the event the pictures or video were in digital form.

BRIEF DESCRIPTION OF THE DRAWINGS

Implementations of contextually-enhanced image content are described with reference to the following Figures. The same numbers may be used throughout to reference like features and components that are shown in the Figures.

DETAILED DESCRIPTION

Overview

Various implementations provide contextually-enhanced image content. The image content is contextually-enhanced by physically associating a readable tag, such as an RFID tag, with the image content. The readable tag contains context data about the image, and is able to be read by a reader, such as an RFID reader that may be communicatively coupled to a mobile device. The readable tag may, in some implementations, be configured for security so that only authorized users have access to the context data, or a portion of the context data, stored on the readable tag. In the context of this document, "image content" is intended to include, by way of example and not limitation, all forms of static images, video, audio/video, and the like.

While features and concepts of contextually-enhanced image content can be implemented in any number of different devices, systems, environments, and/or configurations, implementations of contextually-enhanced image content are described in the context of the following example devices, systems, and methods.

Example Environment

Figure 1:
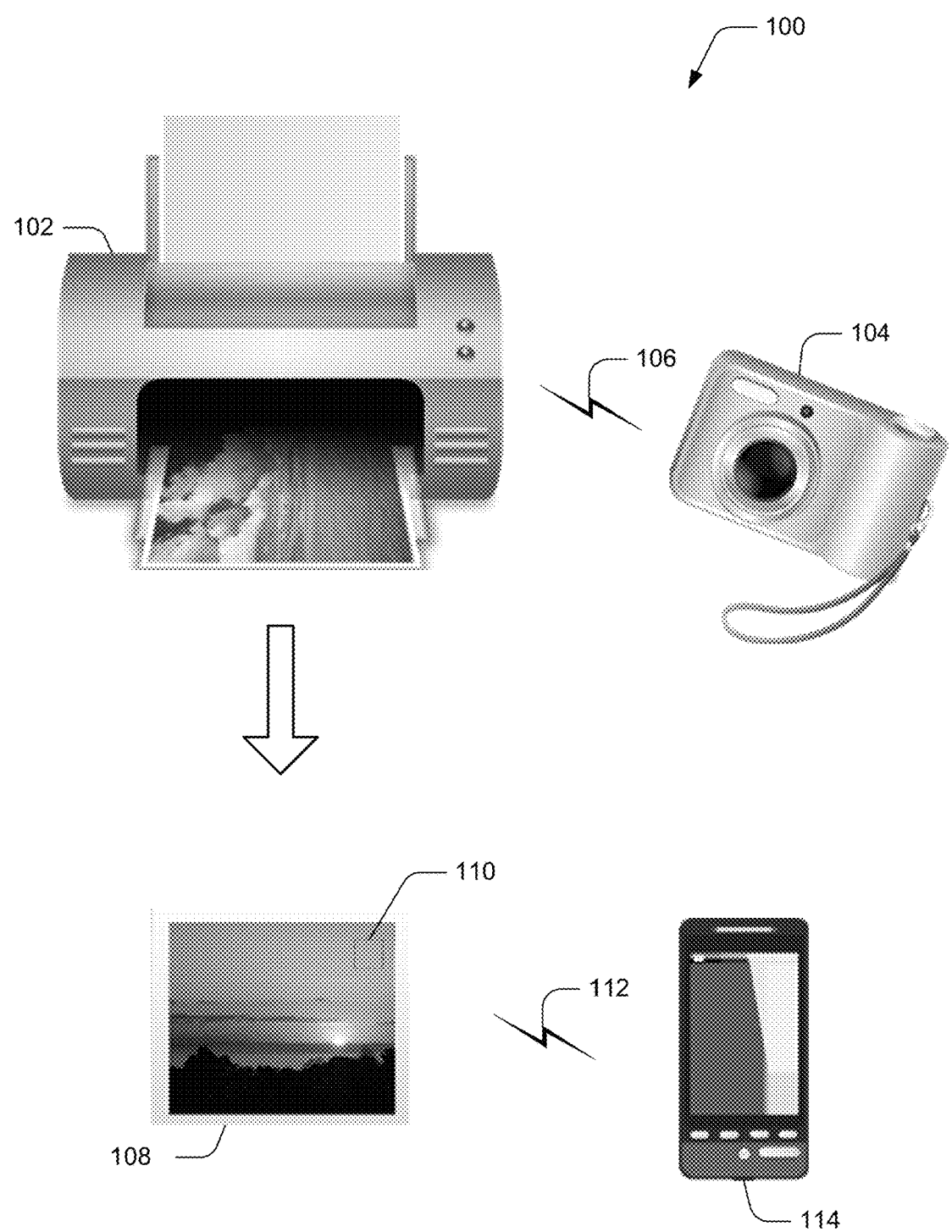
FIG. 1 illustrates an example environment in which examples of contextually-enhanced image content can be implemented.

FIG. 1 illustrates an example operating environment 100 in accordance with one or more implementations. Environment 100 includes a printing device 102 capable of receiving image content from an imager 104, shown here as a digital camera, by way of a suitably configured communication link 106. Imager 104 can comprise any suitable type of imager or imaging device such as, by way of example and not limitation, a smart phone, a tablet, a laptop, a video recorder, a scanner, and the like. The printing device 102 may also receive context data associated with the received image content, from the imager 104 or from another source. The printing device 102 is configured to print an image 108 corresponding to the image content. In some instances, the printing device is configured to save or store context data associated with image content on a readable tag 110. Then, when the image content is printed or otherwise rendered into a consumable format, a readable tag 110 embodying the context data can be associated with the image 108. In some instances, the printing device is configured to physically associate the readable tag 110 with the image content such that the context data can be read by a suitably configured device, such as an RFID reader. The readable tag can include any suitable type of readable tag such as an embedded RFID tag, NFC tag, Bluetooth-readable tag, and so forth.

Readable tag 110, hereinafter referred to as an "RFID tag", is a small, programmable electronic tag that stores context data relating to the associated image content. RFID tag 110 can include various components and features that are utilized for one-way or two-way communication, as by a suitable communication link 112, with a device 114 that includes a reader to read the tag, such as an RFID reader. Device 114 can be embodied as any suitable type of device including, by way of example and not limitation, a smartphone, tablet, PDA, laptop, and so forth.

RFID tag 110 may include a proximity sensor so that it may not be read unless the RFID reader is within a certain proximity or directly in front of the RFID tag. The RFID tag may also be programmed with security features to prevent unauthorized readers from reading the data contained on the RFID tag, as described below in more detail.

RFID reader on device 114 is able to extract information from the RFID tag. In some implementations, the RFID reader transmits an interrogation signal as a broadcast message requesting RFID tags that are in range to return the identifying data or information that the RFID tags have stored, such as through the use of communication link 112. That is, RFID tag 110 wirelessly communicates the stored context data to the RFID reader on device 114 via communication link 112. In some implementations, the device embodying the RFID reader may use virtual reality and body sensory to immerse the user into the picture and produce the environment settings through wearable body sensors to simulate climate (heat/cold/wind/rain/humidity) to further enhance the image content.

In at least some implementations, as the imager 104 captures image content (such as a camera taking a picture, a video recorder capturing a recording, or a scanner scanning a picture), context information associated with the image content can also be captured or otherwise obtained before, during or after image content capture. Such context information can include, by way of example and not limitation, the name of a person or persons in the image content, location, time, weather, and so forth. In addition, a user, i.e. a picture taker, may input additional context information through any suitable type of input device such as a keyboard, voice recorder, speech-to-text device, touch screen, and so forth. The additional context information can include, by way of example and not limitation, the name or names of a person or persons, ages, the occasion (birthday, family vacation, etc.) and any other information that may be relevant or enhance the viewing of the image content.

In various implementations, imager 104 is not limited to capturing new image content. For example, imager 104 may be implemented as a scanner and may scan previously taken photographs (e.g., a photograph of the user's parents as children). In some instances, facial recognition or scene recognition software can be used to make a determination of the people and location in the image content. Alternately or additionally, this information and any additional known information, may be input by the user such as through a keyboard, by voice, or touch screen. The context data may be stored in a file such that the data itself would be either metadata, part of the digital imagery, or in a separate file where an overriding file associates the digital image file and the context data file. In addition, the context data may also be placed in a Machine Learning Service, such as a cloud-based service, and combined with thousands or even millions of other photos and referenced to many other facts associated with the data captured.

In some implementations, the image may not be physically printed but saved to a digital photo frame or USB pen drive to be loaded into a wall mounted TV with USB drive. The digital photo frame or TV, in some instances, is equipped with an RFID controller, RFID antenna, and RFID memory. As an image is presented on the display, the context data stored as metadata in the digital image file is loaded into the RFID memory, and the RFID controller enables the tag based on the setting. An RFID reader is able to read the RFID memory containing the context data for the presented image. As a new image is loaded the process repeats.

The printing device 102 can be implemented with various components, such as a processing system and memory, and any number and combination of various components as further described with reference to FIGS. 2 and 5.

Figure 2:
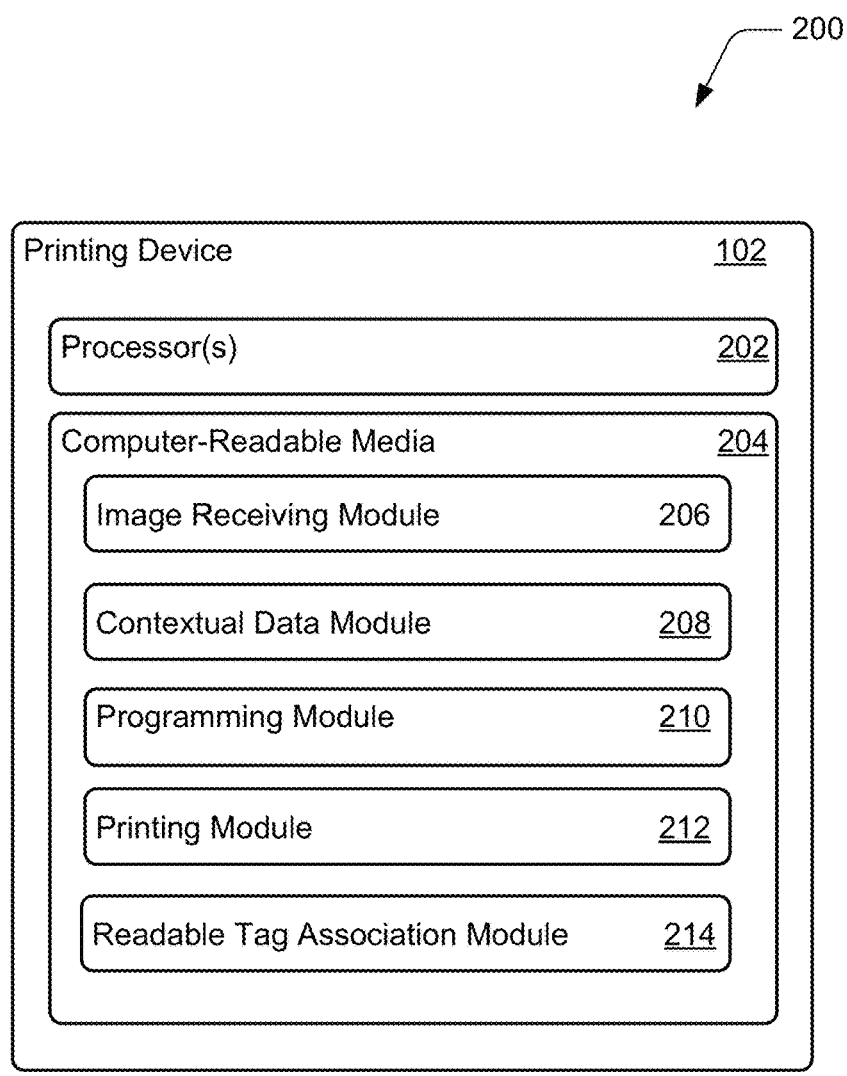
FIG. 2 illustrates a printing device in accordance with one or more implementations.

FIG. 2 illustrates, generally at 200, an example printing device 102 of FIG. 1 in more detail. The printing device 102 includes various components, such as a processor(s) 202 and computer-readable media 204. An operating system (not shown) embodied as computer-readable instructions on computer-readable media 204 can be executed by processor(s) 202 to provide some or all of the functionalities described herein. However, other components and/or hardware can be included without departing from the scope of the claimed subject matter. To facilitate contextually-enhanced image content, printing device 102 includes an image receiving module 206, a contextual data module 208, a programming module 210, a printing module 212, and, in at least some implementations, a readable tag association module 214, illustrated here as residing on computer-readable media 204, but can alternately or additionally be implemented using hardware, firmware, or a combination thereof.

Image receiving module 206 represents functionality that enables the printing device 102 to receive image content, such as static images or video from an imager 104. For example, a user may take a picture with a smartphone and transfer the image data to printing device 102. Image receiving module 206 receives the image content data transferred from the smart phone and stores it until printing. The image receiving module in 206 can receive image content from other sources as well. For example, image receiving module 206 may receive image data from a scanner that has scanned previously taken photographs, a digital camera, a video recorder and so forth. Once the image receiving module receives the image content data, it stores the image content data until printing.

The contextual data module 208 represents functionality that enables the printing device 102 to receive context data associated with image content from one or more sources. In some implementations, contextual data module 208 works in concert with image receiving module 206 to receive and store all data associated with a particular image until printing. Alternatively or in addition, the user may choose to input additional context data pertaining to an image content directly to the contextual data module 208 through any suitable type of input device such as a keyboard, voice recorder, speech-to-text device, touch screen, and so forth. In this manner, a user may add to or otherwise supplement context data that is received by the contextual data module at or around the time the image content is printed.

The programming module 210 represents functionality that enables the printing device 102 to program the context data stored in contextual data module 208 into a readable tag's memory, such as an RFID tag. This can take place by transferring any stored context data to an appropriate RFID tag.

The printing module 212 represents functionality that enables the printing device 102 to print the image 108 (FIG. 1). The printing module 212 receives image content data that is to be printed from the image receiving module 206 and prints the image.

The readable tag association module 214 represents functionality that enables the printing device 102 to physically associate the readable tag 110 with the printed image 108. By way of example and not limitation, as the printing device 102 prints the image 108, a readable tag containing the image's context data is embedded into the image. For example, as the image is printed a readable tag may be adhesively attached or otherwise affixed or mounted to the printed image by the readable tag association module 214. Alternatively, the readable tag associated with the printed image may be provided separately from the image and the user may adhesively attach or otherwise affix or mount the readable tag onto the printed image. In another implementation, the tangible medium on which the image content is printed, such as photographic paper, may contain a readable tag, such as an RFID tag, that the programming module 210 programs with the appropriate context data as the image content is printed on it.

Having considered an example printing device in accordance with one or more implementations, consider now an example method in accordance with one or more implementations.

Figure 3:
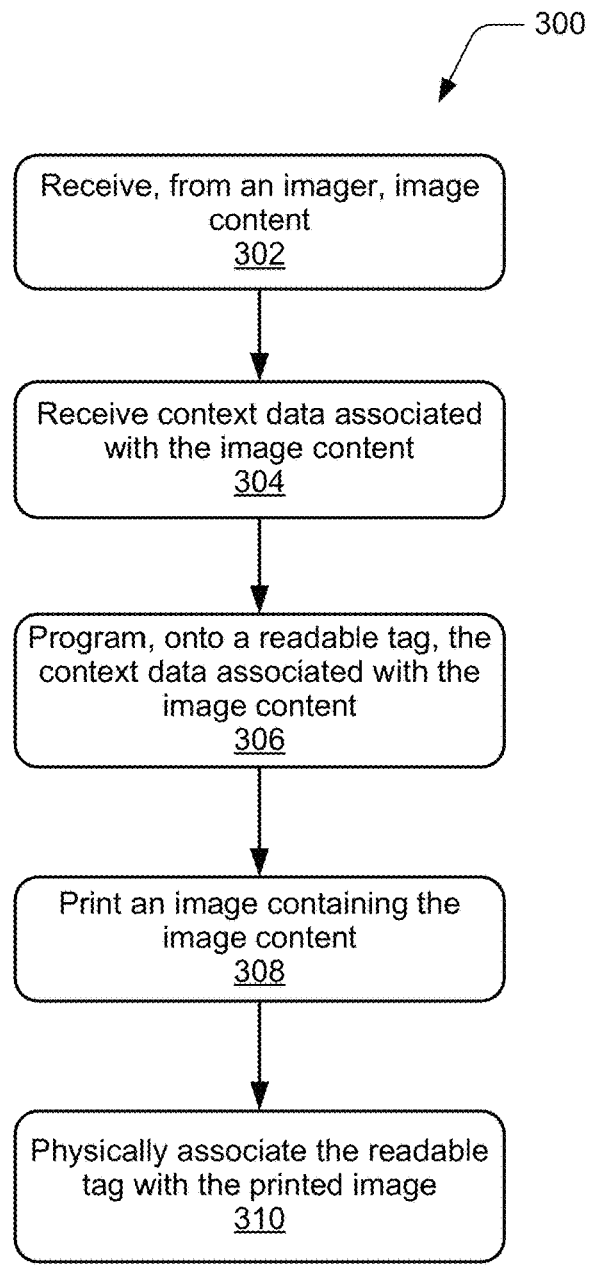
FIG. 3 illustrates an example method of contextually-enhanced image content in accordance with one or more implementations.

Example method 300 is described with reference to FIG. 3 in accordance with various implementations in which image content can be contextually enhanced. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

The order in which the method is described is not intended to be construed as a limitation, and any number or combination of the described method operations can be performed in any order to perform a method, or an alternate method.

At 302, the printing device receives, from an imager, image content that includes and/or is to include context data. In at least some implementations, the image content can be stored in an image receiving module, such as image receiving module 206 (FIG. 2). For example, a user may take a picture using their smart phone and wish to print a physical copy of the corresponding image content. The user may then send the image content to the printing device, where the image content is received and stored until printing.

At 304, the printing device receives context data associated with the image content. The context data may be received at the same time the corresponding image content is received. For example, the context data may include data that is provided as metadata with the corresponding image content. This can be included with the image content in any suitable way such as, by way of example and not limitation, as part of the same file as the image content or as a separate file associated with the image content. Alternately or additionally, the context data may be received at a different time at which the corresponding image content is received, e.g., before or after. For example, the user may directly input all or part of the context data at the time the image content is received by the printing device or at a later time.

At 306, the printing device programs, onto a readable tag, the context data associated with the image content. For example, the printing device may program the context data onto an RFID tag. This can be performed by writing the context data to memory on the readable tag.

At 308, an image is printed that contains the image content. In some implementations, the readable tag containing the context data associated with the image content is also printed.

At 310, the readable tag is physically associated with the printed image. For example as the image is printed, a readable tag, such as an RFID tag containing the context data can be embedded into the image as it is printed. Alternately, the RFID tag may be provided separately such that it can be adhesively attached or otherwise affixed or mounted to the printed image by the user or by some other process, such as a mechanical and/or automated process.

Having considered an example method in accordance with one or more implementations, consider now an example article in accordance with one or more implementations.

Figure 4:
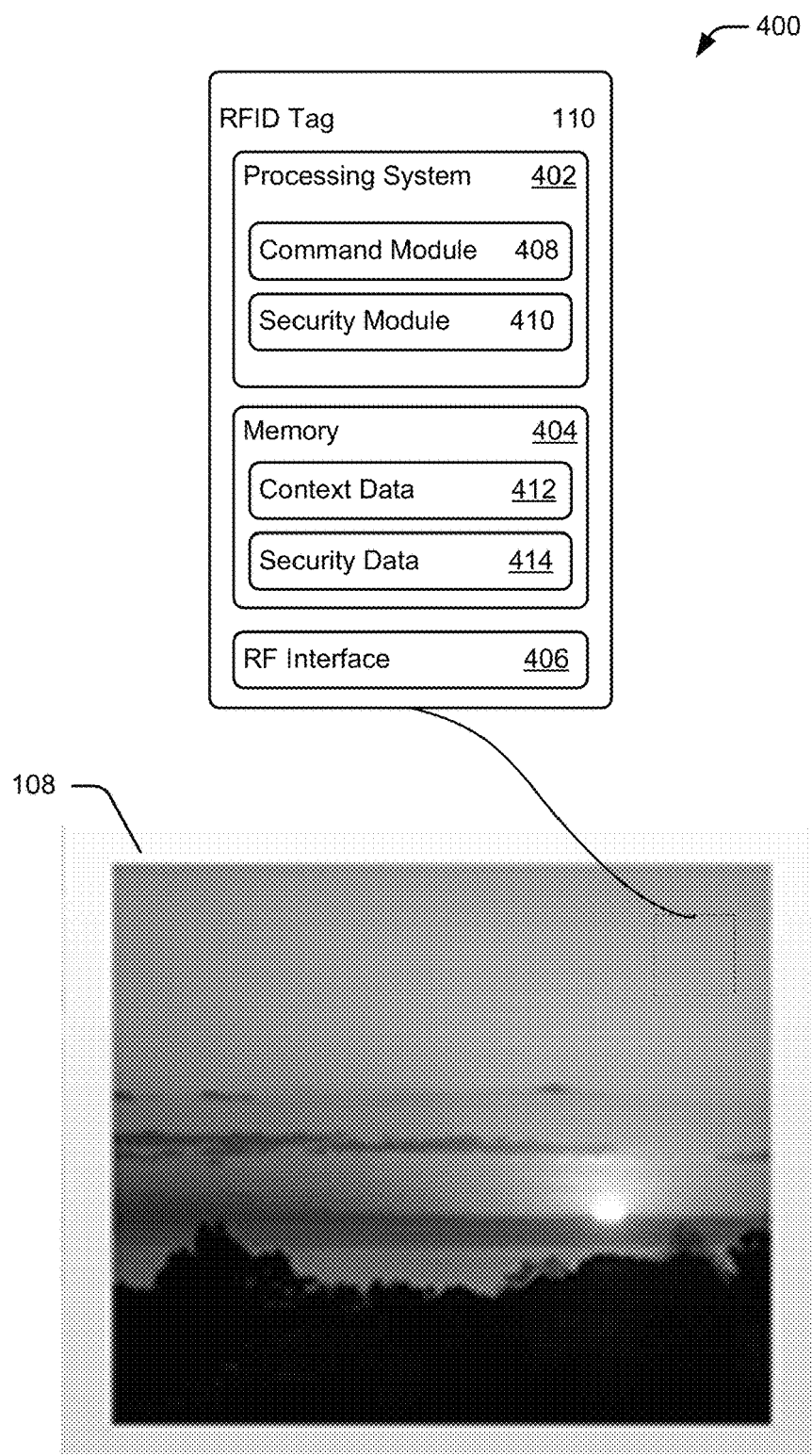
FIG. 4 illustrates a visual image embedded with an RFID tag in accordance with one or more implementations.

FIG. 4 illustrates an example article of manufacture that includes a visual image 108 embodied on a tangible medium and a readable tag in the form of an RFID tag 110 containing context data pertaining to the content in the visual image 108. The RFID tag 110 is configured to be read by an external reader, such as the smart phone 114 of FIG. 1, that is in proximity to the RFID tag.

RFID tag 110 includes various components, such as a processing system 402, a memory 404, and an RF interface 406. However, other components and/or hardware can be included without departing from the scope of the claimed subject matter. Further, RFID tag 110 can be an active RFID tag or a passive RFID tag. Active RFID tags are powered by an internal battery, which is used to power the various internal components. Passive RFID tags, on the other hand, have no internal power source. Rather, passive RFID tags are powered by electromagnetic energy transmitted from an RFID reader. In these instances, RFID tag 110 can include one or more capacitors (not illustrated here) to hold a charge that is used to power the various components.

Processing system 402 represents functionality that performs procedures and/or operations in response to input. Processing system 402 can include any combination of hardware, firmware, and/or software that is configured to respond to input commands and/or achieve a desired result. For example, processing system 402 can include a central processing unit (CPU) configured to execute computer-readable processor instructions stored on memory 404, Field Programmable Gate Arrays (FPGAs), Application-Specific Integrated Circuits (ASICs), and so forth. In this example, processing system 402 includes command module 408 and security module 410.

Command module 408 represents functionality that receives an input command, such as commands received through RF interface 406, and processes the input command to determine and/or perform a corresponding response. Alternately or additionally, command module 408 manages a corresponding state of RFID tag 110 (e.g., active, silent, asleep, awake, etc.). Any type of command can be processed by command module 408, such as a store command to store data and/or authentication information on the RFID tag, and so forth.

In some implementations, command module 408 works in concert with security module 410 to verify and authenticate commands and/or data received from an RFID reader, to give a particular user access to context data stored internally to RFID tag 110. Such information that can include, by way of example and not limitation, user access information associated with a particular user or group of users, image context data, authentication information, and the like. While not illustrated here, when implemented as a software application, command module 408 can be stored on computer-readable storage memory (e.g., memory 404), such as any suitable memory device or electronic data storage implemented in RFID tag 110.

Security module 410 represents functionality that safeguards access to information stored on RFID tag 110. For instance, consider an example in which command module 408 receives a request command from a user for context data 412 stored on memory 404. In turn, command module 408 may first communicate with security module 410 to determine if the user has the authentication to access the context data. For example, when command module 408 receives a command from RFID reader 114, the command may include an access password. In turn, command module 408 passes the command and access password to security module 410 in order to verify whether the received access password included with the command is sufficient to access context data 412 stored in memory 404. If security module 410 validates the access password included with the command, then security module 410 communicates to the command module 408 that the command is valid, and to proceed with processing the command. Conversely, if the security module cannot verify or validate the received access password, then the command module 408 is notified to not process the command. As another example, security module 410 may validate whether the command has originated from a trusted device (e.g., a device with known or valid credentials). Thus, security module 410 provides authentication functionality to command module 408.

Security module 410 may contain a proximity sensor so that the RFID tag may not be read unless the RFID reader is in front of the image containing the RFID tag. A proximity sensor requiring the RFID reader to be in front of the image, prevents readers nearby from reading the RFID tag, e.g. RFID readers that might be present in the next room. While not illustrated here, when implemented as a software application, security module 410 can be stored on memory 404.

Memory 404 represents any suitable type of computer-readable memory device that enables data storage and/or provides persistent storage of data and executable instructions. A computer-readable memory device can include, by way of example and not of limitation, various implementations of random access memory (RAM), read only memory (ROM), flash memory, and other types of storage media in various memory device configurations. Here, memory 404 includes context data 412 and security data 414.

Context data 412 represents the data gathered, or input by the user before, after, or when image content is captured. In some implementations, context data 412 includes but is not limited to persons (i.e. names, relations, etc. . . . ), ages, location and related location information, weather, time of day, date, occasion, and so forth. In some implementations, portions of context data 214 include data received from RFID reader 114 via communication signals 112. For example, after image content is printed with an RFID tag, such as image 108, a user may wish to add additional relevant information about the image to the RFID tag context data 412. The user may input the additional data into RFID reader 114 and, via communication signal 112, transfer the context data to the RFID tag 110. For example, a user may possess a contextually-enhanced image of a recent vacation to the Grand Canyon. He or she may wish to add additional facts about the Grand Canyon from a third party source, such as a cloud service, add additional images from the vacation, and information about what each person featured in the image has been doing in recent months. The user may add this additional information via communication signal 112 using RFID reader 114, or some other input device, to input the updated information to the context data 412. Now, when an RFID reader is used to access the context information for this contextually-enhanced image, the updated information and images are available to be read. In this manner, the user is able to curate their RFID-enhanced content collection easily and conveniently.

Security data 414 includes authentication information that can be used to gate access to context data 412. Security data 414 includes data used to validate users, groups of users, trusted devices, and the like. To validate or authenticate access to RFID tag 110, security module 410 may use portions of security data 414 during the validation process as further described herein. For example, the security data 414 can be set such that any reader device can read all the context data, or only a portion of the data and the remaining data requires a password or device authentication to be read.

Among other things, RF interface 406 represents an ability to conduct wireless communications (e.g., protocol processes, modulating data, demodulating data, signal transmission, signal reception, and so forth). To facilitate unidirectional or bi-directional communications with RFID readers, RF interface 406 includes a transmitter and receiver (or transceiver). In some implementations, command module 408 interfaces with and/or communicates with RF interface 406 to send and receive data. For example, in response to receiving an interrogation signal from RFID reader 114 via RF interface 406, command module 408 formulates a response that may include data from context data 412, and then communicate with RF interface 406 to wirelessly transmit the response to RFID reader 114. The response signals from RF interface 406 can be communicated using low frequency (LF), high frequency (HF), or ultra-high frequency (UHF) radio waves.

Example Device

Figure 5:
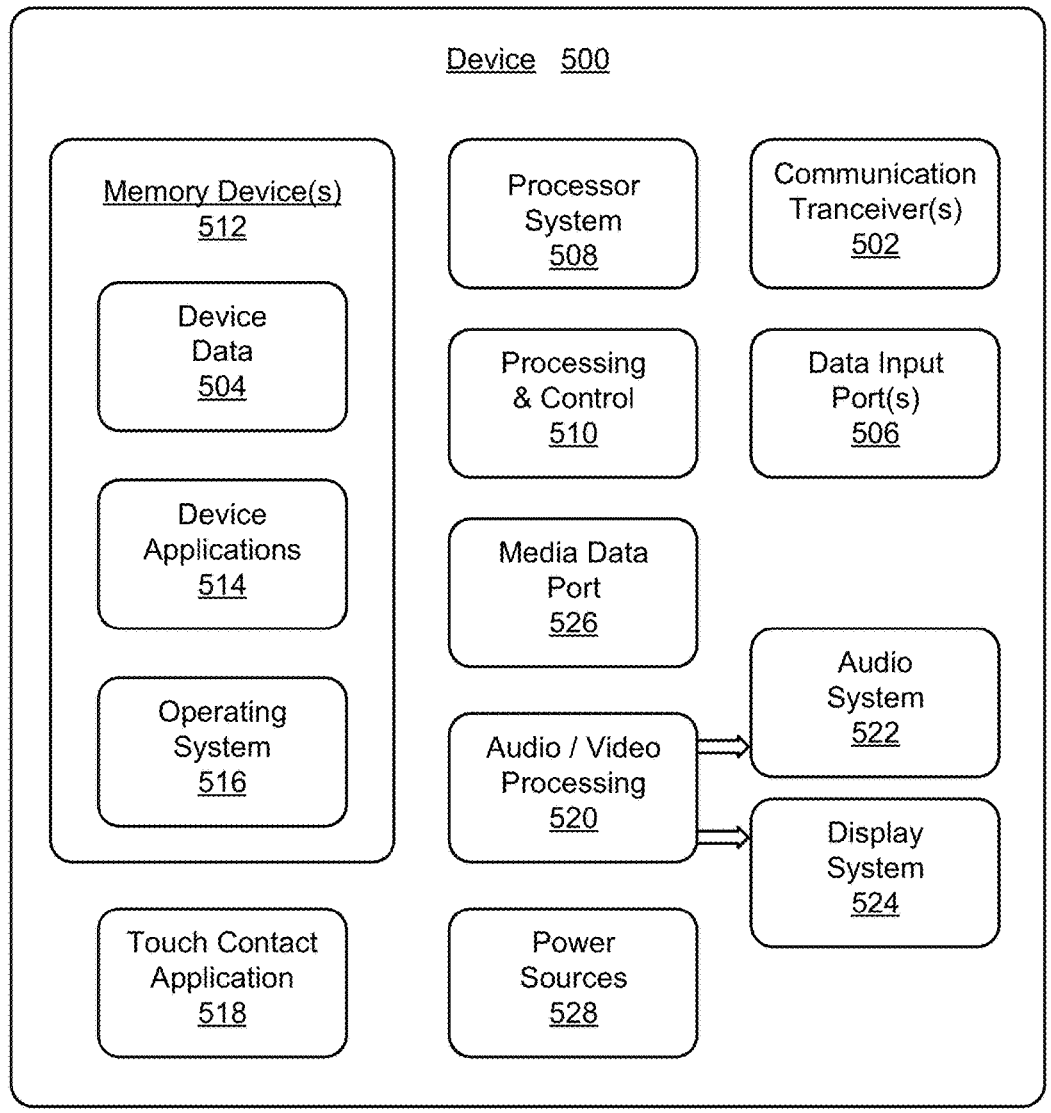
FIG. 5 illustrates an example printing device in accordance with one or more implementations.

FIG. 5 illustrates various components of an example printing device 500 in which examples of contextually-enhanced image content can be implemented. The example printing device 500 can be implemented as any suitable type of the printing device described with reference to the previous FIGS. 1-4. For example, the printing device 102 shown in FIG. 1 may be implemented as the example printing device 500.

The printing device 500 includes communication transceivers 502 that enable wired and/or wireless communication of device data 504 with other devices. Additionally, the printing device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The printing device 500 may also include one or more data input ports 506 via which any type of data, media content, and/or inputs can be received, such as user-selectable inputs to the printing device, messages, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the printing device to any type of components, peripherals, or accessories such as microphones and/or cameras.

The printing device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the printing device can be implemented with any one or combination of software, hardware, firmware, or fixed logic circuitry that is implemented in connection with processing and control circuits, which are generally identified at 510. The printing device 500 may further include any type of a system bus or other data and command transfer system that couples the various components within the printing device. A system bus can include any one or combination of different bus structures and architectures, as well as control and data lines. The processor system 508 can include print functionality such as that described above, to enable images to be printed and, in some instances, embedded with readable tags.

The printing device 500 also includes computer-readable storage memory 512 that enables data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The printing device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The printing device applications may also include a device manager, such as any form of a control application, software application, signal-processing and control module, code that is native to a particular printing device, a hardware abstraction layer for a particular printing device, and so on. In this example, the printing device 500 includes a touch contact application 518.

The printing device 500 also includes an audio and/or video processing system 520 that generates audio data for an audio system 522 and/or generates display data for a display system 524. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 526. In implementations, the audio system and/or the display system are integrated components of the example printing device. Alternatively, the audio system and/or the display system are external, peripheral components to the example printing device.

The printing device 500 can also include one or more power sources 528, such as when the printing device is implemented as a mobile printing device. The power sources may include a charging and/or power system, and can be implemented as a flexible strip battery, a rechargeable battery, a charged super-capacitor, and/or any other type of active or passive power source.

Although implementations of contextually-enhanced image content have been described in language specific to features and/or methods, the subject of the appended claims is not necessarily limited to the specific features or methods described. Rather, the specific features and methods are disclosed as example implementations of contextually-enhanced image content, and other equivalent features and methods are intended to be within the scope of the appended claims. Further, various different examples are described and it is to be appreciated that each described example can be implemented independently or in connection with one or more other described examples.

The invention claimed is:

1. A method comprising:
receiving image content from an imager;
receiving context data associated with the received image content;
loading a first digital image into a digital display device;
presenting the first digital image on the digital display device;
loading context data associated with the first digital image into a readable tag memory associated with the digital display device, such that an authorized reader may read the context data associated with the first digital image;
replacing the first digital image by loading a second digital image into the digital display device;
presenting the second digital image on the digital display device; and
replacing the context data associated with the first digital image by loading context data associated with the second digital image into the readable tag memory associated with the digital display device, such that the authorized reader may read the context data associated with the second digital image.

2. A method as recited in claim 1, wherein receiving image content from an imager comprises receiving previously-scanned photographs.

3. A method as recited in claim 1, wherein the readable tag is an RFID tag.

4. A method as recited in claim 1, wherein the readable tag is configured with security parameters, wherein the security parameters prevent unauthorized readers from reading at least some of the context data on the readable tag.

5. A method as recited in claim 1, wherein the digital display device is a digital photo frame.

6. A method as recited in claim 1, wherein the digital display device is a television.

7. A method as recited in claim 1, wherein the readable tag is configured with a dedicated proximity sensor that is configured to sense a proximity and a location of an external reader such that the readable tag may only be read when the external reader is positioned in front of the printed image.

8. A method as recited in claim 1, wherein context data contained on the readable tag is further configured to be edited by an authorized external reader.

9. A method as recited in claim 1, wherein receiving context data associated with the received image content comprises a user inputting context data using an input device.

10. A digital display device comprising:
at least one processor;
a readable tag controller; and
one or more computer-readable storage devices embodying processor executable instructions that, responsive to execution by the at least one processor, implement operations comprising:
receiving image content from an imager;
receiving context data associated with the received image content;
loading a first digital image into the digital display device;
presenting the first digital image on the digital display device;
loading context data associated with the first digital image into a readable tag memory associated with the digital display device, such that an authorized reader may read the context data associated with the first digital image;
replacing the first digital image by loading a second digital image into the digital display device;
presenting the second digital image on the digital display device; and
replacing the context data associated with the first digital image by loading context data associated with the second digital image into the readable tag memory associated with the digital display device, such that the authorized reader may read the context data associated with the second digital image.

11. A device as recited in claim 10, wherein the digital display device is a digital photo frame.

12. A device as recited in claim 10, wherein the digital display device is a television.

13. A device as recited in claim 10, wherein the readable tag is an RFID tag.

14. A device as recited in claim 10, wherein the readable tag is configured with security parameters, wherein the security parameters prevent unauthorized readers from reading at least some of the context data on the readable tag.

15. A device as recited in claim 10, wherein context data contained on the readable tag is further configured to be edited by an authorized external reader.

16. A device as recited in claim 10, wherein the readable tag is configured with a dedicated proximity sensor that is configured to sense a proximity and a location of an external reader such that the readable tag may only be read when the external reader is positioned in front of the printed image.

17. A device as recited in claim 10, wherein receiving image content from an imager comprises receiving previously scanned photographs.

18. A device as recited in claim 10, wherein receiving context data associated with the received image content comprises a user inputting data using an input device.

* * * * *